United States Patent
Fujii et al.

[11] Patent Number: 6,123,218
[45] Date of Patent: Sep. 26, 2000

[54] CONSTRUCTION FOR ATTACHING A RADIANT HEAT BLOCKING METAL FOIL OF AN INSULATED CONTAINER

[75] Inventors: Takafumi Fujii; Masashi Yamada; Kensuke Furuyama; Atsuhiko Tanaka, all of Tokyo, Japan

[73] Assignee: Nippon Sanso Corporation, Tokyo, Japan

[21] Appl. No.: 09/160,820

[22] Filed: Sep. 25, 1998

[30] Foreign Application Priority Data

Oct. 2, 1997 [JP] Japan .................................. 9-270186

[51] Int. Cl.⁷ .................................................. A47J 41/00
[52] U.S. Cl. ................................ 220/592.21; 220/23.89; 220/592.05
[58] Field of Search ...................... 220/23.89, 592.21, 220/592.05

[56] References Cited

U.S. PATENT DOCUMENTS

| Re. 21,618 | 11/1940 | O'Leary | 220/592.21 |
|---|---|---|---|
| 3,397,720 | 8/1968 | Jones | 220/592.21 |
| 4,396,457 | 8/1983 | Bakermans | 29/827 |
| 5,918,743 | 7/1999 | Uitz | 206/509 |

FOREIGN PATENT DOCUMENTS

| 283397 | 11/1996 | Taiwan | B60J 3/00 |

Primary Examiner—Bryon P. Gehman
Assistant Examiner—Troy Arnold
Attorney, Agent, or Firm—Darby & Darby

[57] ABSTRACT

The invention relates to a construction for attaching a radiant heat blocking metal foil to an insulating layer of an insulated container. Heretofore, a construction for attaching a radiant heat blocking metal foil involves positioning, an adhesive or adhesive tape on the rear face of the metal foil to thereby attach the foil at a predetermined position. However this has the problem that the foil can be attached at an unintended position, so that accurate positioning is not achieved, and the fixing takes time. The invention addresses such problems, with a construction enabling accurate fixing of the metal foil at a predetermined position, by forming at least one hole in a radiant heat blocking metal foil provided along the container wall face of a container formed with an insulating layer on the wall portion of the insulated container, and mounting the metal foil along a predetermined container wall face in a state wherein an adhesive or adhesive tape has not been applied, and after freely adjusting the arrangement position to a predetermined condition, affixing and securing the container wall face which can be seen via the hole to the metal foil at the peripheral portion of the hole, using adhesive tape.

5 Claims, 2 Drawing Sheets

6,123,218

CONSTRUCTION FOR ATTACHING A RADIANT HEAT BLOCKING METAL FOIL OF AN INSULATED CONTAINER

BACKGROUND OF THE INVENTION

1. Field of the Invention

The present invention relates to a construction for attaching a radiant heat blocking metal foil, serving as an insulating means, to an insulated container, in order to maintain and improve the insulating properties of insulated containers, including household insulated containers such as vacuum flasks, cooler boxes and heat-retaining lunch boxes, and insulating materials used for thermal insulation equipment.

This application is based on Patent Application No. Hei 9-270186 filed in Japan, the content of which is incorporated herein by reference.

2. Description of the Related Art

With household insulated containers such as vacuum flasks, particularly metal vacuum flasks, cooler boxes and heat-retaining lunch boxes, and thermal insulation equipment such as refrigerators, as an insulating means for retaining heat, there are those which use vacuum insulation or a solid insulating material such as urethane foam, and those which use an insulating layer with a gas having low thermal conductivity such as krypton, xenon or argon, or air filled between the container walls. Moreover with any of these, in order to improve the insulating property for retaining heat, a plating layer may be formed on the container wall where the insulating layer is formed, using a metal having high thermal reflectivity such as aluminum, copper, nickel and the like, or these metals may be made into a foil which is disposed on the face of the container wall of the insulating layer, to thereby reduce heat loss due to the radiant heat which is one of the factors in insulation.

With the above method where a plating layer is formed however, there is the disadvantage in that the plating operation is not only complex but also manufacturing costs are high. Accordingly, the method where a metal foil is disposed on the face of the container wall of the insulating layer is widely used, because it has the advantage that the manufacturing process is simpler and manufacturing costs are less. With this method however, when the foil is secured to the container wall face of the insulating layer, it is secured by positioning double-sided adhesive tape or an adhesive on the back face of the metal foil. At the time of attaching the foil, since the adhesive tape or the adhesive is hidden on the back of the foil and cannot be seen by the worker fitting the foil, it is difficult to check the state of the adhesive tape and the positional relation between the adhesive tape and the container wall face where it is attached. Therefore, it is necessary to make a preliminary plan in detail for the arrangement and carry out a rehearsal operation. Moreover, once the foil is attached, if the proposed attaching position is not correct, it is very difficult to peel off and re-adhere without damaging the thin and easily damaged foil.

When the metal foil is disposed on the container wall face of the insulating layer, if the container wall face on which this is to be arranged is for example parallel flat surfaces or a cylindrical side wall face, there will be no problem. However, if the metal foil is to be disposed on a container wall face which is not uniform parallel faces, such as a sphere or a conical face, the metal foil will have remaining faces. Therefore, complicated manufacturing process and design control have been necessary to uniformly adhere the metal foil, by overlapping or cutting out the remaining faces.

Furthermore, in spite of the detailed design control and manufacturing process, it is very difficult to adhere and secure the metal foil to container wall faces which are not uniform, in a state where it is disposed uniformly as desired.

SUMMARY OF THE INVENTION

In view of the above problems, it is an object of the present invention to provide a construction for attaching a radiant heat blocking metal foil to a container wall of an insulating layer of an insulated container, which facilitates attaching the metal foil arranged on the container wall face of the insulating layer in order to block radiant heat, and improves workability, as well as making it possible to always uniformly attach the metal foil to the attachment face.

With a view to solving the above problems and attaining the above objectives, a first aspect of the present invention involves a construction for attaching a radiant heat blocking metal foil of an insulated container, wherein at least one hole is formed in the radiant heat blocking metal foil disposed along the container wall of the insulating layer of the insulated container, and the radiant heat blocking metal foil is secured to the container wall via the hole.

The construction for attaching the radiant heat blocking metal foil of an insulated container may be such that one of the at least one hole in the radiant heat blocking metal foil is formed by piercing therein at a position corresponding to an approximate center of the container wall of the insulating layer where the radiant heat blocking metal foil is to be disposed, and the metal foil is disposed on the container wall with the hole as a reference.

When the insulated container in which the radiant heat blocking, metal foil is disposed is a container having a spherical wall or non-parallel side walls, the construction for attaching the radiant heat blocking metal foil is such that the metal foil to be disposed on the container wall of the insulating layer of the container is formed preferably in the shape of a container having a side wall formed in pleats around the periphery, and the radiant heat blocking metal foil is formed with at least one hole, and is disposed around the container wall of the insulating layer of the insulated container, and the radiant heat blocking, metal foil is secured to the container wall via the at least one hole.

Furthermore, the construction for attaching a radiant heat blocking metal foil of an insulated container may be such that one of the at least one hole in the radiant heat blocking metal foil formed in the shape of a container having a side wall formed in pleats around the periphery, and which is disposed on the container wall of the insulating layer of a container having a spherical wall or non-parallel side walls, one is formed by piercing at a position corresponding to an approximate center of the container wall of the insulating layer where the radiant heat blocking metal foil is to be disposed, and the metal foil is disposed on the container wall with the hole as a reference.

The construction for attaching the radiant heat blocking metal foil of the insulated container according to the present invention is constructed and put into practice as described above, thus giving the following effects.

Attachment of the radiant heat blocking metal foil to the insulating layer disposed on the container wall of the insulated container is performed by piercingly providing at least one hole in the metal foil at the time of attachment to the container wall face of the container where the insulating layer is formed, and affixing the container wall face of the insulating layer, the surface of which can be seen via the hole, to the peripheral portion of the hole to thereby join and secure the two parts. Hence the positioning can be freely adjusted in a state where the adhesive has not yet been applied. Therefore, unintentional attachment due to the adhesive does not occur, failures in the attachment operation are practically eliminated, and the positioning of the metal foil for arrangement and attachment can be done precisely, thereby performing the attachment operation with high yield. Moreover, the attachment operation is simplified, thus improving workability.

By piercing one of the at least one hole in the approximately central position of the shape, then when the metal foil is disposed on the container wall of the insulating layer precise positioning is possible so that workability is further improved. Moreover, if a protrusions is formed on the container wall to match to the size and the position of hole, and the hole and the protrusion are engaged, positioning is facilitated so that workability can be even further improved.

Furthermore, when the opposed container wall faces of the insulating layer of a container having a spherical surface such as a bowl-shaped container, or of a container such as a cup-shaped container with the drinking mouth enlarged are not parallel, then by making the metal foil to be disposed thereon in a shape having a side wall formed in pleats around the periphery thereof, it becomes possible to attach the metal foil by arranging the metal foil close to the container wall face of the insulating layer, even if the face on which the metal foil is disposed is not a uniform plane. Hence, the arrangement operation is extremely easy, and workability is improved, and the ridges of the pleats of the metal foil can be arranged regularly around the container wall. As a result, the metal foil can be arranged to uniformly cover the container. Moreover, the ridges of the foil are not brought into contact with the other container which is not wrapped by the foil, and moreover, a multi-layered insulation effect partially results, thus improving the heat-retaining properties.

Furthermore, since at least one hole is by piercingly provided in the metal foil, and the container wall face of the insulating layer, the surface of which can be seen via the hole, is affixed to the peripheral portion of the hole to thereby join and secure the two parts, the positioning can be freely adjusted in a state where the adhesive has not yet been applied, and precise positioning can be carried out with good workability.

Furthermore, if a protrusion is formed on the container wall to match to the size and the position of the hole, and the hole and the protrusion are engaged, positioning is facilitated so that workability can be even further improved, as described above.

Moreover, with each of the attachment constructions described above, the radiant heat blocking effect can be enhanced by using a sealing material such as an adhesive tape or sticky tape comprising a metal foil, as a material for affixing the radiant heat blocking metal foil to the container wall via the hole.

Furthermore, as well as the constructions being very simple and the piercing processing easily effected, the attachment operation is also simple and easily carried out. In addition, as described above, since the yield is improved, manufacturing costs are reduced, with the effect that an insulated container with good performance can be provided.

DESCRIPTION OF THE PREFERRED EMBODIMENTS

Figure 1:
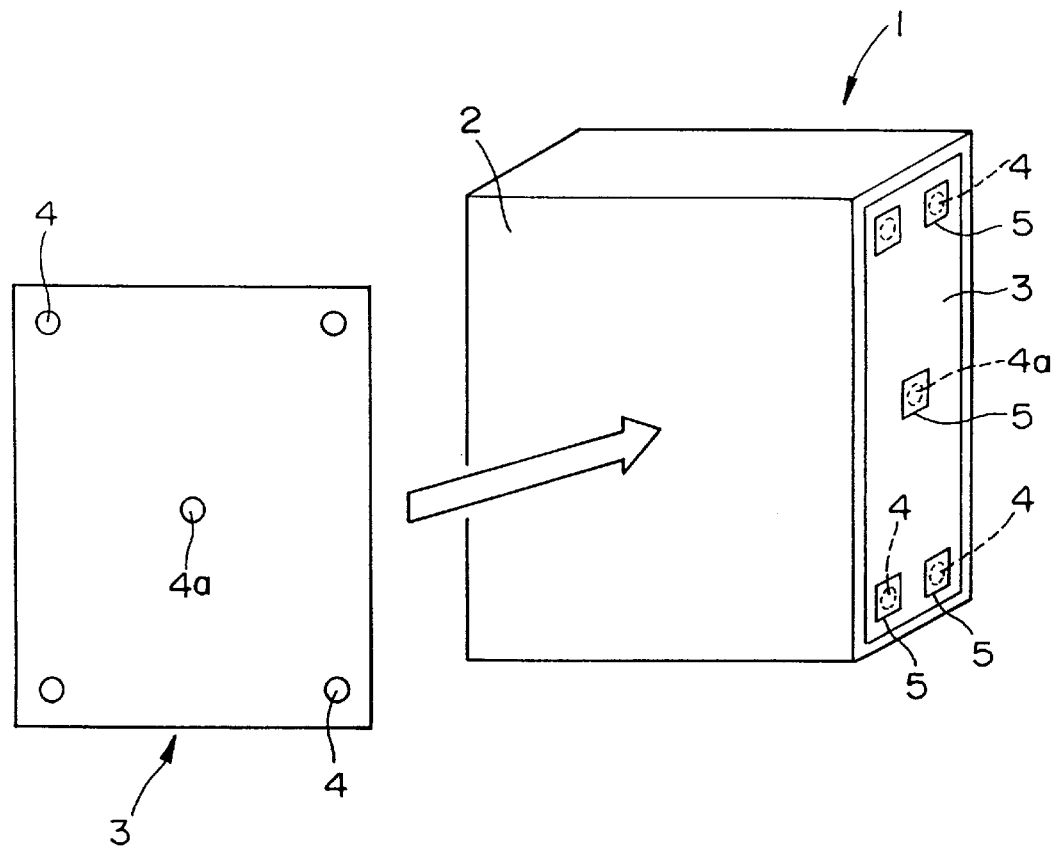
FIG. 1 is a perspective view of an insulating layer illustrating one example of a construction for attaching a radiant heat blocking metal foil according to the present invention.

An embodiment of a construction for attaching a radiant heat blocking metal foil to an insulated container according to the present invention will now be described.

The present invention is a construction for attachment of a metal foil having high heat reflectance, to the container wall of an insulating layer, as an insulating layer for blocking heat transfer due to radiant heat which is one of the factors in insulation, in insulated containers such as the household insulating tableware including vacuum flasks, cooler boxes, heat-retaining lunch boxes and insulated cups, and insulated containers such as refrigerators, whereby the attachment position can be freely adjusted and the metal foil can be fixed in a precise position with good workability.

An insulating layer disposed on the wall of the insulated container to be insulated is formed, and the radiant heat blocking metal foil is arranged and fixed to a container wall such as an inner wall or an outer wall of a container made of a synthetic resin or a stainless steel, and which has an insulating material filled inside the insulating layer, or which has an evacuated space formed therein, or which is filled with air or a gas having a low heat conductivity. At the time of attaching the metal foil, one or more holes are piercingly provided in the metal foil, the hole is placed on a predetermined position of the container wall of the insulating layer, and the container wall face of the insulating layer appearing through the hole made in the metal foil and the metal foil at the peripheral portion of the hole are attached together by affixing means to be thereby joined and secured. Therefore, at the time of attachment and fixation of the metal foil, it is not necessary to apply or arrange an adhesive in advance on the face of the metal foil to be attached. Hence, positioning of the metal foil to be attached can be precisely adjusted in a state wherein an adhesive has not been applied, and the metal foil is attached and fixed after being arranged at the position. Hence failures of arrangement are reduced and fixation by precise positioning becomes possible.

By positioning one of the at least one hole made in the metal foil at a position corresponding to the approximate center of the insulating layer face where the metal foil is to be affixed, the hole becomes a reference for deciding the relative position of the metal foil and the container wall face, between the container wall face of the container where the insulating layer is formed and the metal foil to be arranged thereon. Hence adjustment of the arrangement position is facilitated and precise positioning of the arrangement position becomes possible. If a protrusion is formed on the container wall, corresponding to the size and the position of the hole, and the hole and the protrusion are engaged, positioning becomes more accurate and easy, thus further improving the workability.

Furthermore, when the container wall face which forms an insulating layer of a container having a sphere such as a bowl-like container is a curved surface, or the opposed container wall faces of the insulating layer are not parallel, such as with a cup-shaped insulated container with the drinking mouth enlarged, then by making preferably the metal foil to be disposed on the container wall into a container shape having a side wall formed in pleats around the periphery thereof, it becomes possible to attach the metal foil to the container wall of the insulating layer where a curved or non-parallel container wall is formed, even though the container wall is not a uniform plane, by arranging the metal foil close to the container wall face of the insulating layer. Moreover, the arrangement operation becomes extremely easy and workability is improved. In addition, one or more holes are piercingly provided in the metal foil, and the container wall face of the insulating layer on the surface which can be seen via the hole and the peripheral portion of the hole in the metal foil are adhered together to be joined and secured. Hence the position of the metal foil can be freely adjusted in a state wherein an adhesive has not been applied.

Since the position adjusting operation can be done in a state wherein an adhesive has not been applied, unintentional attachment due to the adhesive does not occur during manufacturing, failures in the attachment operation are practically eliminated, and the positioning of the metal foil for arrangement and attachment can be done precisely, thereby performing the attachment operation with high yield. Moreover, by providing one of the at least one hole made in the metal foil in the approximately central position on the bottom face of the metal foil having a shape of a container, corresponding to the approximate center in the bottom portion located in the central portion of the container wall of the insulating layer where the metal foil is to be affixed, the hole becomes a reference for deciding the relative positioning of the metal foil and the container wall face, between the container wall face where the insulating layer is formed and the metal foil to be arranged thereon. Hence adjustment of the arrangement position is facilitated and precise positioning of the arrangement position becomes possible. Furthermore, in spite of the easy arrangement operation, ridges of the pleats of the metal foil can be regularly wrapped around the container, to cover the container with the metal foil uniformly. Moreover, ridges of the foil are not brought into contact with the other container which is not wrapped by the foil, beyond the insulating layer, and a layered insulation effect partially results, thus improving the heat-retaining properties.

Moreover, with each of the attachment constructions described above, the radiant heat blocking effect can be enhanced by using a sealing material such as an adhesive tape or a sticking tape comprising a metal foil, as a material for affixing the radiant heat blocking metal foil to the container wall via the hole.

Examples of the construction for attaching a radiant heat blocking metal foil of an insulated container, according to the present invention will now be described with reference to the accompanying drawings.

EXAMPLE 1

FIG. 1 is a perspective view of an insulating layer, illustrating one example of the attachment construction of a radiant heat blocking metal foil according to the present invention. Reference numeral 1 denotes an insulating layer in a slab form to be arranged between container walls of an insulated container (not shown). As an example of the slab-like insulating layer 1, for example, after filling a powdery insulating material such as pearlite into a container 2 made of a synthetic resin such as ethylenevinylalcohol copolymer or a metal container made of stainless steel, the container is held in an evacuated state to form the slab-like insulating layer 1, Alternatively a gas having low heat conductivity such as krypton, xenon or argon, or air is filled and sealed inside a similar container 2 made of a synthetic resin to form the slab-like insulating layer 1.

Furthermore, there is a slab-like insulating layer where the container wall of the insulated container itself has a double-wall construction, having inner and outer containers made of a synthetic resin or a metal with a void portion therebetween, and the void portion in the double-wall construction is evacuated so that the evacuated void becomes a slab-like insulating layer 1 Moreover, there are those in which the slab-like insulating layer 1 is formed with only polystyrene or urethane foam.

On the container wall of the container 2 of such a slab-like insulating layer 1, a radiant heat blocking metal foil 3 is arranged. As a metal for this metal foil 3, metals having a high heat reflectance such as aluminum, nickel, copper or the like can be effectively used. In the metal foil, one or more holes 4 are made. The holes may be provided in a desired number, by properly selecting the number according to the size of the surface area of the slab-like insulating layer 1 where the hole is provided in a prescribed location. Of these holes 4, one is made as a hole 4a in the approximate central position of the metal foil in terms of the shape, so as to make precise positioning possible, and improve workability at the time of positioning the hole in a subsequent process. Moreover, the size of the hole is suitably selected according to the size of the slab-like insulating layer 1 to be used, but otherwise is not particularly limited.

The metal foil 3 as described above is attached to the wall of the container 2 of the slab-like insulating layer 1 in a manner described below. First, the metal foil is cut in accordance with the size and the shape of the wall area of the container 2 of the slab-like insulating layer 1, where the metal foil is to be arranged, the metal foil is then placed on the wall face of the container 2 at a predetermined position on the slab-like insulating layer 1, and after the accuracy of the arrangement position is properly adjusted, while visually confirming the arrangement, the metal foil is affixed from the upper face of the hole 4 with a prepared adhesive tape 5, so that this holes 4 are stopped up. As a result, the container wall face of the slab-like insulating layer 1 which can be seen from the hole 4 in the metal foil 3 and the peripheral portion of the hole 4 of the metal foil 3 are joined by the adhesive tape 5, to thereby affix and secure the metal foil 3 to the container wall at the predetermined position on the slab-like insulating layer 1. In addition, at the time of attachment by the adhesive tape 5, if the hole 4a formed at a position corresponding to the approximate central portion on the container wall of the slab-like insulating layer 1 where the metal foil 3 is to be arranged is first affixed and secured in order to accurately perform the positioning, the subsequent operations are simplified.

Moreover, if protrusions (not shown) are formed on the container wall of the insulating layer 1 of the container, matching the size and the position of holes 4 which pierced in the metal foil 3, and the holes and the protrusions are engaged, the positioning becomes more accurate and easy, thus further improving workability.

Furthermore, the adhesive tape 5 may of course be a one-sided tape, and as for the quality of material, if a sealing material such as an adhesive tape comprising a metal foil which is similar to the metal foil 3 is used, the radiant heat blocking effect can be further promoted. Of course the fixation is not limited to the use of the adhesive tape 5, and may be by an adhesive.

In example 1, the description has been given for the case where the slab-like insulating layer 1 is composed of a container 2 made of a synthetic resin or a metal. However the same applies to the case where the material itself, such as polystyrene or urethane foam as described above forms the slab-like insulating layer 1. In this case instead of the container wall face of the container 2, the material face of the insulating material can be read in its place. It is thus to be fully understood that an intercommonality exists for these attachment constructions. Furthermore, in the above example 1, the description has been given for the case where the radiant heat blocking metal foil 3 is arranged on the outer face of the slab-like insulating layer 1. However the metal foil 3 may be arranged on the inner face thereof to give a similar effect. In this case, the metal foil is positioned on and attached to the inner face of the container 2, before the slab-like insulating layer 1 is assembled.

As described above, attachment of the radiant heat blocking metal foil 3 to the slab-like insulating layer 1 according to the present invention is performed in such a manner that holes 4 are made in the metal foil 3 for attaching the metal foil 3 to the wall face of the container 2 of the slab-like insulating layer 1, and the wall face of the container 2 of the slab-like insulating layer 1 and the peripheral portion of the holes in the metal foil 3 are adhered together via the holes 4 to be thus joined and secured. Hence, the positioning operation of the metal foil can be freely adjusted without having an adhesive attached thereon Therefore, unintentional adhesion due to the adhesive is not caused, failures in the attachment operation are practically eliminated and the positioning of the metal foil and attachment can be done precisely, thereby performing the attachment operation with high yield. Moreover, the attachment operation is simplified, thus improving workability.

In example 1, the description has been given for the case where the insulating layer 1 is composed of the slab-like container. However, in a construction for attaching a radiant heat blocking metal foil to the insulating layer of a container where the container wall has a curved face in the form of a bowl, or has a non-parallel opposite side walls centered on an axis in the form of a cup, similarly with FIG. 1, the construction for attaching a radiant heat blocking metal foil of an insulated container may be such that one of the at least one hole in the radiant heat blocking metal foil is formed by piercing at a position corresponding to an approximate center of the container wall of the insulating layer where the radiant heat blocking metal foil is to be disposed, and the metal foil is disposed on the container wall with the hole as a reference.

EXAMPLE 2

As another example of the present invention, a construction for attaching a radiant heat blocking metal foil to the insulating layer of a container where the container wall has a curved face in the form of a bowl or a china bowl, or has a shape where the opening is larger than the bottom portion as with a cup, that is, having non-parallel opposed side walls, centered on an axis, will now be described with reference to FIG. 2. Here, the same reference numerals are given to parts in common with the construction of example 1 shown in FIG. 1, and detailed description thereof is omitted.

Figure 2:
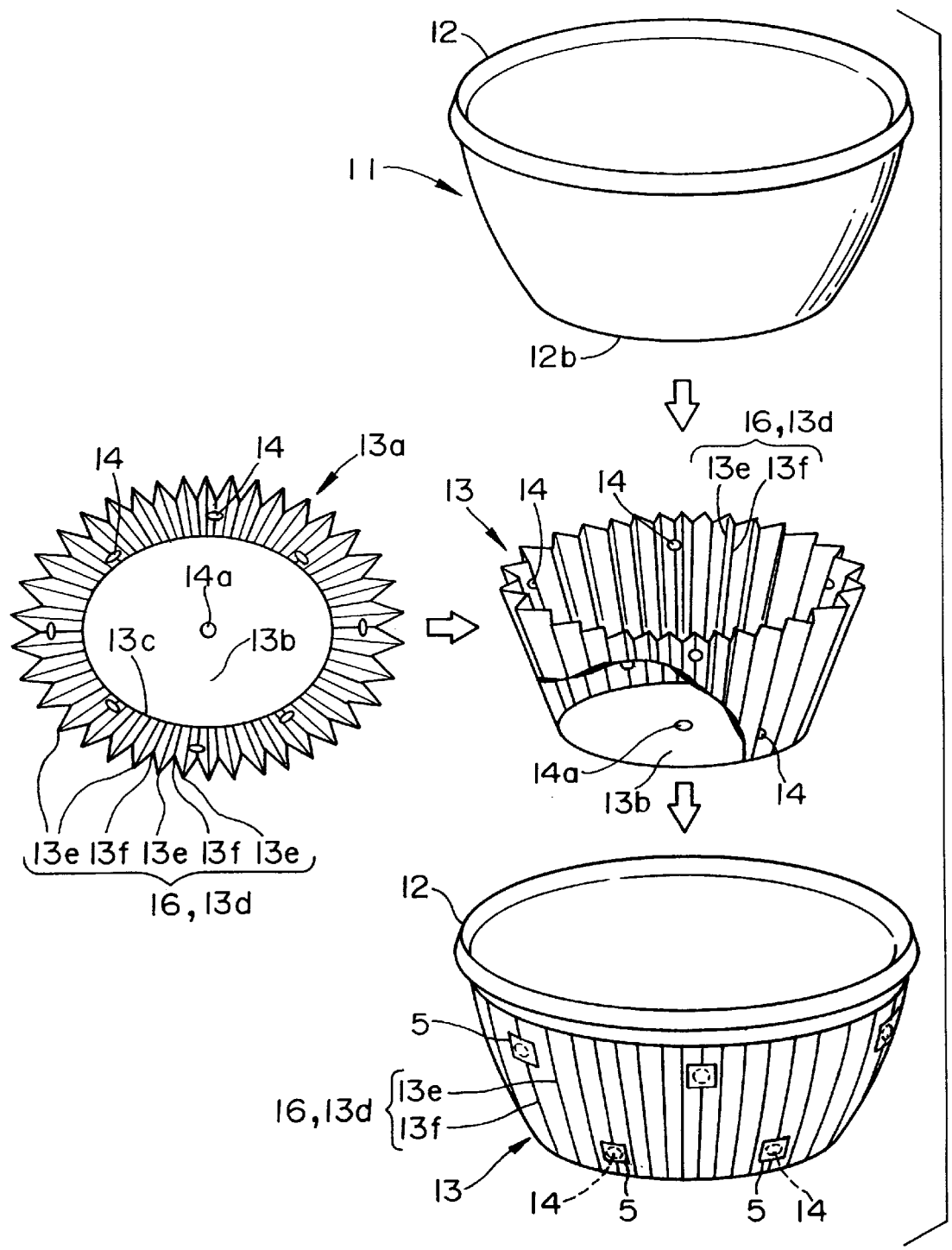
FIG. 2 is an assembly drawing for the attachment of a radiant heat blocking metal foil to an insulating layer of a bowl-shaped insulated container.

FIG. 2 is an assembly drawing for attaching a radiant heat blocking metal foil to an insulating layer of a bowl-shaped insulated container. Reference numeral 11 denotes an insulating layer arranged on a container wall of a bowl-shaped insulated container (not shown). This bowl-shaped insulating layer 11 comprises a container 12 made of, for example, a synthetic resin or a metal having a spherical curved face adjusted to the shape of a bowl-shaped insulated container into which the insulating layer is to be arranged. This may be a bowl-shaped insulating layer 11 into which a gas having low heat conductivity such as krypton, xenon or argon, or air is filled and sealed, one in which the container wall of the insulated container itself has a double-wall structure having inner and outer walls with a void portion therebetween, and the void portion in the double-wall structure is evacuated to make the evacuated void a bowl-shaped insulating layer 11, or one in which a bowl-shaped insulating layer 11 is formed with only a polystyrene or urethane foam.

On the container wall of the container 12 of such a bowl-shaped insulating layer 11, a radiant heat blocking metal foil 13 with the container shape is arranged. As a metal for this metal foil 13, metals having a high heat reflectance such as aluminum, nickel, copper or the like can be effectively used. This metal foil 13 is sectioned in accordance with the shape and the size of a bottom portion 12b of the container 12 of the bowl-shaped insulating layer 11 into which the metal foil 13 is arranged, designating a central portion 13b of the metal foil 13a cut in a circular shape as a bottom portion, and a circular peripheral portion 13d is raised upward along the sectioned peripheral edge 13c. As a result, the metal foil 13 in the form of a container having the bottom portion 13b and the peripheral portion 13d as a side wall can be obtained. At the same time, on the side wall formed by the raised peripheral portion 13d, ridges 13e and valleys 13f extending vertically are formed alternately and continuously around the peripheral wall of the side wall 13d to form the metal foil 13 in the shape of a container having the side wall 13d in the form of pleats 16.

With the metal foil 13 having the shape of a container formed as described above, one or more holes 14 are made. The holes may be provided in a desired number, appropriately considering the size of the surface area of the bowl-shaped insulating layer 11. Of these holes 14, one is made at the central position in terms of the shape, making it possible to locate the metal foil at a precise position at the time of positioning in a subsequent process. Hence the workability can be improved. In the case of the shape of the container as shown in the figure, corresponding to the center position the container wall in the bottom portion 12b of the container 12 of the bowl-shaped insulating layer 11, by making a hole 14a at the center of the bottom portion (central portion) 13b of the metal foil 13 having the shape of a container, favorable effects such as accuracy of the arrangement position and ease with the positioning operation can be obtained at the time of adjusting the arrangement position in a subsequent step.

Figure 3:
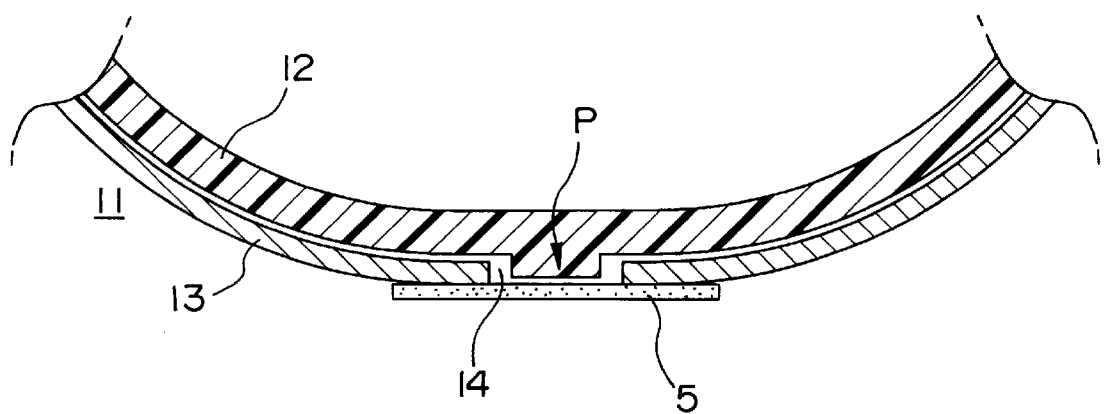
FIG. 3 is a enlarged partial view of a portion for attaching a radiant heat blocking metal foil to a bowl-shaped insulated container having a protrusion on the container wall.

Furthermore, if as shown in the enlarged partial view of FIG. 3, a protrusion P is formed on the container wall on the insulating layer 11 side of the container 12, matching the size and the arrangement position of the hole 14 pierced in the metal foil 13 and the protrusion and the hole are engaged, the positioning becomes even more accurate and easy, and workability can be further improved. The height of this protrusion P is preferably from 0.1 to 1.0 mm.

Furthermore, the number and size of the holes 14 is determined according to the size of the bowl-shaped insulating layer 11 to be used, and suitably selected according to the adhesion (cohesion) strength required for fixing. Considering workability, the size is preferably from 20 to 50 mm in diameter. In addition, when arrangement of the metal foil 13 is performed by determining direction, the hole is preferably a rectangle having a side of from 20 to 50 mm.

Into the metal foil 13 having the shape of a container with a side wall in the form of pleats 16 as described above, is inserted from its bottom portion 12b the container 12 of the bowl-shaped insulating layer 11, to be arranged therein. With the increase in size of the diameter of the bowl-shaped insulating layer 11, the pleats 16 located at the position expand so that the container wall of the container 12 of the bowl-shaped insulating layer 11 and the metal foil 13 are brought into close contact and engaged. Moreover, since the side wall 13d of the metal foil 13 having the shape of a container is formed in the form of pleats 16, the side wall 13d of the metal foil 13 exerts a contraction force toward the center due to the pleats. Hence the metal foil 13 can be closely engaged with and attached to the wall of the container 12 of the bowl-shaped insulating layer 11. With respect to the increase of the size in the diametric direction of the container 12 of the bowl-shaped insulating layer 11, the increase in size can be absorbed by the pleats 16 formed as described above, within the allowable range of the contraction.

After the metal foil 13 having the shape of a container is attached to the wall face of the container 12 of a predetermined bowl-shaped insulating layer 11, and the arrangement position is precisely adjusted as intended, then while visually confirming the arrangement, separately prepared adhesive tapes 5 or adhesive is attached from the upper face of the holes 14 so that the holes 14 are stopped up. As a result, the wall face of the container 12 of the bowl-shaped insulating layer 11 which can be seen through the holes 14 made in the metal foil 13, and the peripheral portion of the holes 14 in the metal foil 13 are bonded with the adhesive tapes 5 so that the metal foil 13 is affixed and secured to the container wall at a predetermined position on the bowl-shaped insulating layer 11. With respect to the adhesion with the adhesive tapes 5 for positioning precisely, if the hole 14a formed at a position corresponding to the approximate center of the container wall in the bottom portion 12b of the container 12 of the bowl-shaped insulating layer 11 where the metal toil 13 is to be arranged is first affixed and secured, the adjustment operation in subsequent positioning will become simplified. In addition, the adhesive tape may certainly be a one-sided tape, and as for the quality of material, if a sealing material such as an adhesive tape comprising a metal foil which is similar to the metal foil 13 and has a high reflectance is used, the radiant heat blocking effect can be further promoted. Of course that the fixation is not limited to the use of the adhesive tape 5, and may be by an adhesive.

In example 2, the description has been given for the case where the bowl-shaped insulating layer 11 is composed of a container made of a synthetic resin or a metal. However the same applies to the case where the insulated material itself, such as polystyrene or urethane foam as described above forms the bowl-shaped insulating layer 11. In this case, instead of the container wall face of the container 12, the material face of the insulating material can be read in its place. These both have common operational effects, and the metal foil 13 can be attached thereto in a similar manner. Furthermore, in example 2, the description has been given for the case where the radiant heat blocking metal foil 13 with the container shape is arranged on the outer face of the container 12 of the bowl-shaped insulating layer 11. However the metal foil 13 may be arranged on the inner face thereof to give a similar effect. In this case, prior to assembling the bowl-shaped insulating layer 11, the attachment position on the inner face of the container 12 can be adjusted beforehand and then affixed and secured via the hole 14.

As described above, the radiant heat blocking metal foil 13 in example 2 has the shape of a container, and is constructed with pleats 16 with vertically extending ridges 13e and valleys 13f, formed alternately and continuously around the periphery (side wall) 13d. Hence, even though the attachment of the metal foil 13 to the container 12 of the bowl-shaped insulating layer 11 which forms a curved and non-parallel container wall is not performed on a uniform plane, it becomes possible to arrange and attach the metal foil 13 closely and uniformly on the container wall face of the container 12 of the bowl-shaped insulating layer 11. Furthermore, the arrangement operation is extremely easy and the ridges of the pleats of the aluminum foil can be regularly wrapped and arranged to cover the container uniformly with the aluminum foil. Moreover, ridges of the foil are not brought into contact with the other container which is not wrapped by the foil, beyond the insulating layer, and a multi-layered insulation effect partially results, thus improving the heat-retaining properties.

Moreover, since a hole 14 is made in the metal foil 13, and the wall face of the container 12 of the bowl-shaped insulating layer 11 on the surface which can be seen via the hole 14 and the peripheral portion of the hole 14 in the metal foil 13 are adhered together to be joined and secured, the positioning work of the metal foil 13 can be performed by freely adjusting the position thereof in a state wherein an adhesive has not been applied. Furthermore, unintentional adhesion due to the adhesive does not occur, failures in the attachment operation are practically eliminated, and the positioning of the metal foil for arrangement and attachment can be done precisely, thereby performing the attachment operation with high yield. Moreover, the attachment operation is simplified, thus improving workability.

What is claimed is:

1. A double-wall insulated container of inner and outer nested containers with a space between the container walls, the space and the container walls defining an insulating layer;

at least one protrusion formed on the wall of one of said containers forming said insulating layer;

a metal foil having at least one hole into which said at least one protrusion fits with a substantial part of said metal foil disposed on said one container wall of said insulating layer; and an adhesive tape on said foil overlying and covering said at least one hole.

2. An insulated container according to claim 1, wherein said at least one hole in said radiant heat blocking metal foil is formed therein at a position corresponding to an approximate center of said one container wall of the insulating layer where the radiant heat blocking metal foil is disposed.

3. An insulated container according to claim 1, wherein said tape is of metal foil sealing material.

4. An insulated container as in claim 1 wherein said at least one protrusion is on the wall of said one container facing into said space.

5. An insulated container as in claim 1 wherein said metal foil is of the same general shape as the wall of said one container having said at least one protrusion.

* * * * *